US012773975B2

(12) United States Patent
Park et al.

(10) Patent No.: US 12,773,975 B2
(45) Date of Patent: Oct. 27, 2026

(54) ELECTRONIC BRAKE DEVICE

(71) Applicant: DAEGU GYEONGBUK INSTITUTE OF SCIENCE AND TECHNOLOGY, Daegu (KR)

(72) Inventors: Tae Sang Park, Daegu (KR); Choong Pyo Jeong, Daegu (KR); Sung Ho Jin, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 18/713,819

(22) PCT Filed: May 2, 2023

(86) PCT No.: PCT/KR2023/005947
§ 371 (c)(1),
(2) Date: May 28, 2024

(87) PCT Pub. No.: WO2024/122762
PCT Pub. Date: Jun. 13, 2024

(65) Prior Publication Data

US 2026/0167167 A1 Jun. 18, 2026

(30) Foreign Application Priority Data

Dec. 7, 2022 (KR) ........................ 10-2022-0169659

(51) Int. Cl.
*B60T 13/74* (2006.01)
*B60T 1/06* (2006.01)

(52) U.S. Cl.
CPC ............ *B60T 13/746* (2013.01); *B60T 1/065* (2013.01)

(58) Field of Classification Search
CPC ................................ B60T 13/746; B60T 1/065
See application file for complete search history.

(56) References Cited

U.S. PATENT DOCUMENTS 3,770,879 A * 11/1973 Watson .................. F16H 37/00 475/7
5,524,735 A * 6/1996 Gee ...................... F16D 65/562 188/332

(Continued)

FOREIGN PATENT DOCUMENTS

CN 211308536 8/2020
CN 112498320 3/2021

(Continued)

*Primary Examiner* — Henry Y Liu
(74) *Attorney, Agent, or Firm* — LEX IP MEISTER, PLLC

(57) ABSTRACT

The present disclosure provides an electronic brake device including a driving unit which provides a driving force, a power transmission unit including a driving shaft connected to one side of the driving unit to rotate in a first direction or a second direction by the driving force, a power distribution unit including a differential gear unit connected to one side of the power transmission unit, a first driven shaft connected to one side of the differential gear unit, and a second driven shaft connected to the other side of the differential gear unit, and a transmission gear unit which receives the driving force from the first driven shaft and the second driven shaft and provides the driving force to a pressing unit which applies a braking force to a disk, wherein the pressing unit selectively applies the braking force to the disk as the driving shaft rotates in the first direction or the second direction.

11 Claims, 8 Drawing Sheets

(56) References Cited

U.S. PATENT DOCUMENTS

| | | | | |
|---|---|---|---|---|
| 5,769,189 | A * | 6/1998 | Heibel | B60T 11/046 188/106 P |
| 9,145,950 | B2 * | 9/2015 | Dettenberger | F16D 65/28 |
| 9,188,182 | B2 * | 11/2015 | Park | F16H 48/08 |
| 9,316,277 | B2 * | 4/2016 | Winkler | F16D 65/18 |
| 9,353,811 | B2 | 5/2016 | Gutelius et al. | |
| 9,476,469 | B2 * | 10/2016 | Gutelius | F16D 51/28 |
| 9,476,470 | B2 * | 10/2016 | Park | B60T 13/741 |
| 9,587,692 | B2 * | 3/2017 | Gutelius | F16D 65/18 |
| 9,772,029 | B2 * | 9/2017 | Thomas | F16H 1/36 |
| 9,879,739 | B2 * | 1/2018 | Gutelius | F16D 65/0068 |
| 9,920,804 | B2 * | 3/2018 | Gutelius | F16D 65/22 |
| 11,339,842 | B2 * | 5/2022 | Al-Mahshi | F16D 55/22 |
| 11,518,359 | B2 * | 12/2022 | Kwon | B60T 13/741 |
| 11,535,225 | B2 * | 12/2022 | Esnee | F16D 55/226 |
| 11,719,296 | B2 * | 8/2023 | Al-Mahshi | B60T 13/746 188/72.1 |
| 11,773,936 | B2 * | 10/2023 | Al-Mahshi | F16D 55/228 188/72.3 |
| 11,858,486 | B2 * | 1/2024 | Hong | B60T 13/746 |
| 11,953,068 | B2 * | 4/2024 | Choi | B60T 13/741 |
| 12,570,263 | B2 * | 3/2026 | Al-Mahshi | B60T 13/741 |
| 2009/0294224 | A1 * | 12/2009 | Sakashita | F16D 65/568 188/72.2 |
| 2014/0034432 | A1 * | 2/2014 | Bull | B60T 13/741 188/106 R |
| 2015/0129371 | A1 * | 5/2015 | Gutelius | F16D 55/228 188/72.1 |
| 2015/0144438 | A1 * | 5/2015 | Park | F16D 65/18 188/72.1 |
| 2015/0204402 | A1 * | 7/2015 | Gutelius | F16D 65/22 188/162 |
| 2015/0354651 | A1 * | 12/2015 | Park | F16D 55/228 188/72.1 |
| 2016/0290424 | A1 * | 10/2016 | Gutelius | F16D 65/183 |
| 2017/0002882 | A1 * | 1/2017 | Gutelius | F16D 65/14 |

FOREIGN PATENT DOCUMENTS

| | | |
|---|---|---|
| JP | 2017096362 | 6/2017 |
| JP | 2017155917 | 9/2017 |
| JP | 6209297 | 10/2017 |
| KR | 20220129371 | 9/2022 |

* cited by examiner

ELECTRONIC BRAKE DEVICE

TECHNICAL FIELD

The present disclosure relates to an electronic brake device.

BACKGROUND ART

In vehicle brakes, by using a frictional force, kinetic energy is converted into heat energy to generate a braking force, and in general, a pad presses both sides of a disk that rotates with a wheel of a vehicle.

Such vehicle brakes are used to slow down or stop a traveling vehicle or used to maintain a stop state of a parked vehicle. Among the vehicle brakes, a parking brake called a hand brake or side brake is provided in a vehicle to maintain a state of a parked vehicle.

Generally, a parking brake is operated by operating a parking lever provided at one side of a driver seat inside a vehicle. For example, when a driver pulls a parking lever, while a cable connected to the parking lever is pulled, a rear wheel brake assembly connected to the cable is operated to generate a braking force. Conversely, when the driver returns the parking lever to the original position thereof, while the cable is loosened, the braking force disappears.

Since the operation of a parking brake using a parking lever is performed by a driver, when the driver inadvertently parks a vehicle without operating the parking brake, the vehicle may move unintentionally to cause an accident. Since the parking lever should be pulled with a certain amount of force to operate the parking brake, operating the parking brake may be cumbersome for vehicle drivers.

Accordingly, recently, electronic parking brakes (EPBs) for electronically controlling the operation of a parking brake have been applied to vehicles.

Instead of a driver pulling a parking lever to apply a parking brake, in EPBS, through the driver simply operating a switch or an instruction from an electronic control unit (ECU) that serves to control a vehicle, a motor is driven to operate the parking brake.

Examples of such EPBs include electro-hydraulic brakes (EHBs) and electro-mechanical brakes (EMBs).

EHBs are configured to generate a braking force using hydraulic cylinders and pistons, and EMBs are configured to generate a braking force using motors and gears.

EHBs have disadvantages in that hydraulic devices have a complex configuration and there is a limit to the reliability of braking performance, but EMBs have a relatively simple configuration and are capable of securing the reliability of braking performance.

In the case of an EMB, an ECU detects a braking situation and transmits a braking signal to the EMB, and in the EMB, motors and gears are operated based on the transmitted signal to displace a pad and press both sides of a disk, thereby generating a braking force. The braking force may be released by reversely operating a driving gear.

In such EMBs, one motor, which is used to generate and release a braking force, is provided to simplify a device configuration, and since a time taken to generate a braking force is the same as a time taken to release the braking force when one motor is used, there is a problem of not being able to respond appropriately even in a situation in which a quick response time is required to generate or release the braking force.

Furthermore, since a plurality of parts should be provided to make a difference between a time taken to generate a braking force and a time taken to release the braking force, there is a problem that it is difficult to design a compact brake system.

DETAILED DESCRIPTION OF THE DISCLOSURE

Technical Problem

The present disclosure provides an electronic brake device including a first piston unit and a second piston unit capable of, since a first one-way clutch and a second one-way clutch allow a first driving gear and a second driving gear to rotate only in preset directions, moving forward or backward with respect to a pad at different speeds and forces when a parking braking operation is performed and parking braking is released.

Technical Solution to Problem

An aspect of the present disclosure provides an electronic brake device including a driving unit which provides a driving force, a power transmission unit including a driving shaft connected to one side of the driving unit to rotate in a first direction or a second direction by the driving force, a power distribution unit including a differential gear unit connected to one side of the power transmission unit, a first driven shaft connected to one side of the differential gear unit, and a second driven shaft connected to the other side of the differential gear unit, and a transmission gear unit which receives the driving force from the first driven shaft and the second driven shaft and provides the driving force to a pressing unit which applies a braking force to a disk, wherein the pressing unit selectively applies the braking force to the disk as the driving shaft rotates in the first direction or the second direction.

Advantageous Effects of the Disclosure

According to the present disclosure, a differential gear unit of an electronic brake device distributes a driving force uniformly to a first piston unit and a second piston unit, thereby obtaining an effect of improving a braking function.

In addition, since an electronic brake device includes a first one-way clutch and a second one-way clutch, there is an effect that a magnitude of torque output during a parking brake operation may be set to be different from torque output when parking braking is released.

BEST MODE

Figure 1:
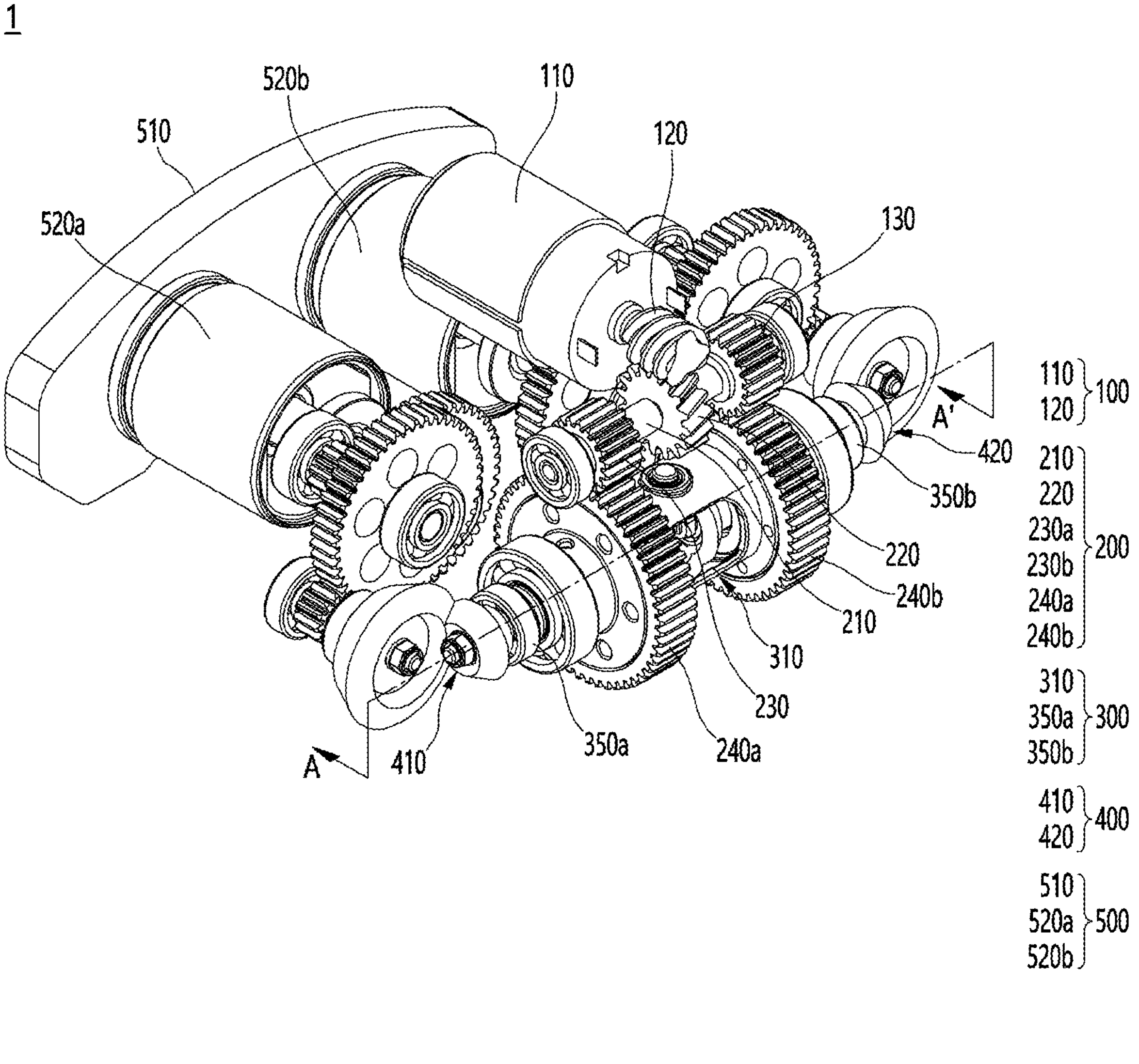
FIG. 1 is a perspective view of an electronic brake device according to an embodiment of the present disclosure.

An aspect of the present disclosure provides an electronic brake device including a driving unit which provides a driving force, a power transmission unit including a driving shaft connected to one side of the driving unit to rotate in a first direction or a second direction by the driving force, a power distribution unit including a differential gear unit connected to one side of the power transmission unit, a first driven shaft connected to one side of the differential gear unit, and a second driven shaft connected to the other side of the differential gear unit, and a transmission gear unit which receives the driving force from the first driven shaft and the second driven shaft and provides the driving force to a pressing unit which applies a braking force to a disk, wherein the pressing unit selectively applies the braking force to the disk as the driving shaft rotates in the first direction or the second direction.

In addition, the pressing unit may include a pad which applies the braking force to the disk, and a first piston unit and a second piston unit which provide the driving force to the pad, and the transmission gear unit may include a first transmission gear which transmits the driving force from the first driven shaft to the first piston unit and a second transmission gear which transmits the driving force from the second driven shaft to the second piston unit.

In addition, the power transmission unit may further include a first one-way clutch connected to one side of the driving shaft, a first driving gear which is rotatable only in the first direction by the first one-way clutch, a second one-way clutch connected to the other side of the driving shaft, and a second driving gear which is rotatable only in the second direction by the second one-way clutch.

In addition, the first direction and the second direction may be opposite directions.

In addition, the power transmission unit may include a first driven gear engaged with and connected to the first driving gear and rotatably connected to the first driven shaft, and a second driven gear engaged with and connected to the second driving gear and rotatably connected to the second driven shaft.

In addition, the first driven shaft and the second driven shaft may be disposed in series while sharing the same rotation axis.

In addition, a gear ratio of the first driving gear to the first driven gear may be different from a gear ratio of the second driving gear to the second driven gear.

In addition, the first driving gear and the first driven gear may be provided as a pair of spur gears, and the second driving gear and the second driven gear may be provided as a pair of spur gears.

In addition, the differential gear unit may be connected to each of the first driven gear and the second driven gear and may control a distribution of the driving force provided by the first driven gear or the second driven gear to transmit the driving force to the first driven shaft and the second driven shaft.

In addition, the differential gear unit may include a first side gear connected to share the same rotation axis with the first driven shaft, a second side gear connected to share the same rotation axis with the second driven shaft, and a pair of pinion gears which are perpendicularly engaged with and connected to the first side gear and the second side gear, respectively, and are disposed to face each other, and the pair of pinion gears may be connected to the first driven gear and the second driven gear, respectively.

In addition, the driving shaft and the first driven shaft may be disposed in parallel.

In addition, the driving shaft and the second driven shaft may be disposed in parallel.

In addition, the first piston unit and the second piston unit may be disposed in parallel and may come into contact with the same surface of the pad.

MODE OF DISCLOSURE

Since the present disclosure can apply various transformations and have various embodiments, specific embodiments will be illustrated in the drawings and described in detail in the detailed description. Effects and features of the present disclosure, and methods for achieving them will become clear with reference to the embodiments described later in detail together with the drawings. However, the present disclosure is not limited to the embodiments disclosed below and may be implemented in various forms.

Hereinafter, embodiments of the present disclosure will be described in detail with reference to the accompanying drawings, wherein like reference numerals refer to the same or corresponding components throughout the drawings, and a redundant description thereof will be omitted.

In the following embodiments, the expressions used in the singular such as "a," "an," and "the" are intended to include the plural forms as well, unless the context clearly indicates otherwise.

In the following embodiments, it will be understood that the terms such as "including," "comprising," and "having" specify the presence of stated features or components, but do not preclude the presence or addition of one or more other features or components.

When a certain embodiment may be implemented differently, a specific process order may be performed differently from the described order. For example, two consecutively described processes may be performed substantially at the same time or performed in an order opposite to the described order.

In the drawings, components may be exaggerated or reduced in size for convenience of description. For example, the sizes and thicknesses of the respective components shown in the drawings are arbitrarily shown for convenience of description, and thus the following embodiments are not necessarily limited thereto.

Figure 2:
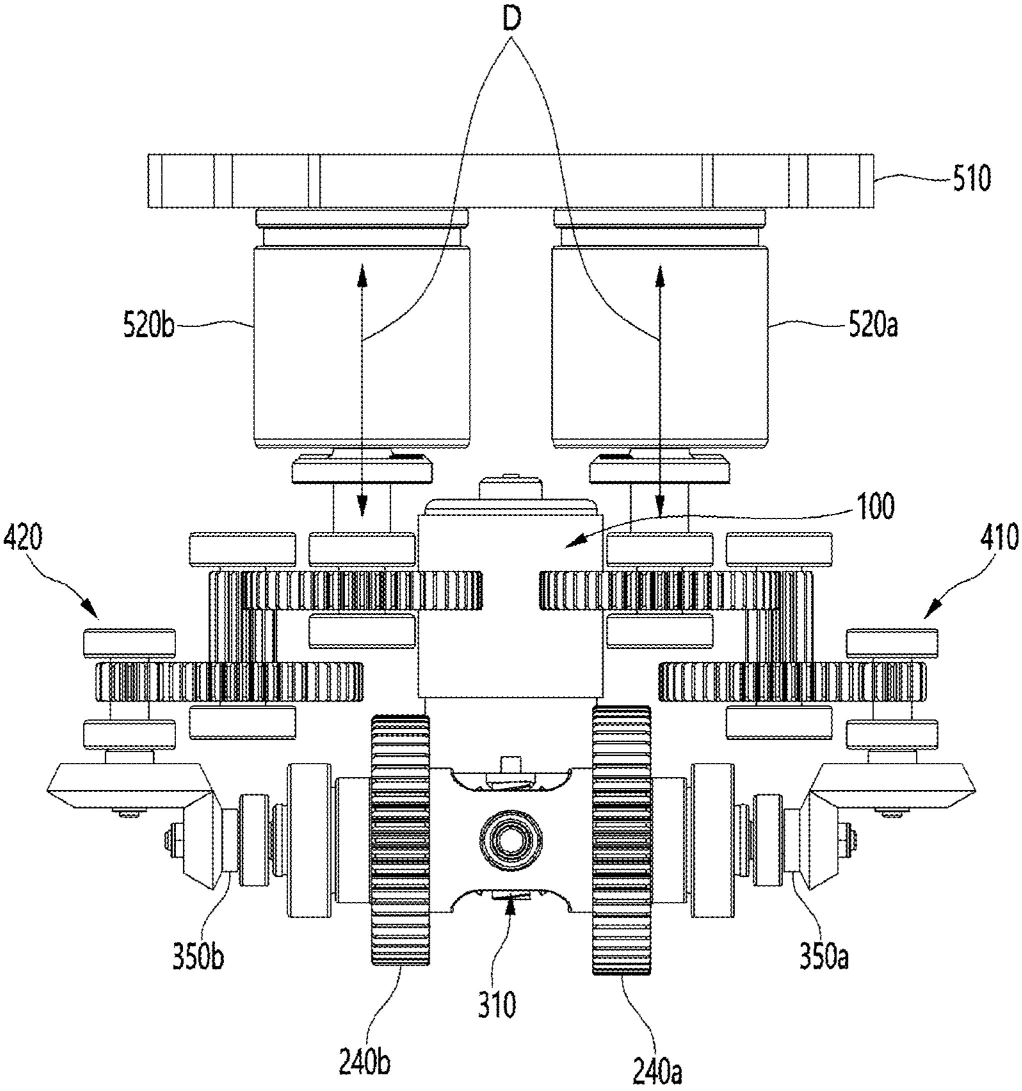
FIG. 2 is a plan view of the electronic brake device according to an embodiment of the present disclosure.
Figure 3:
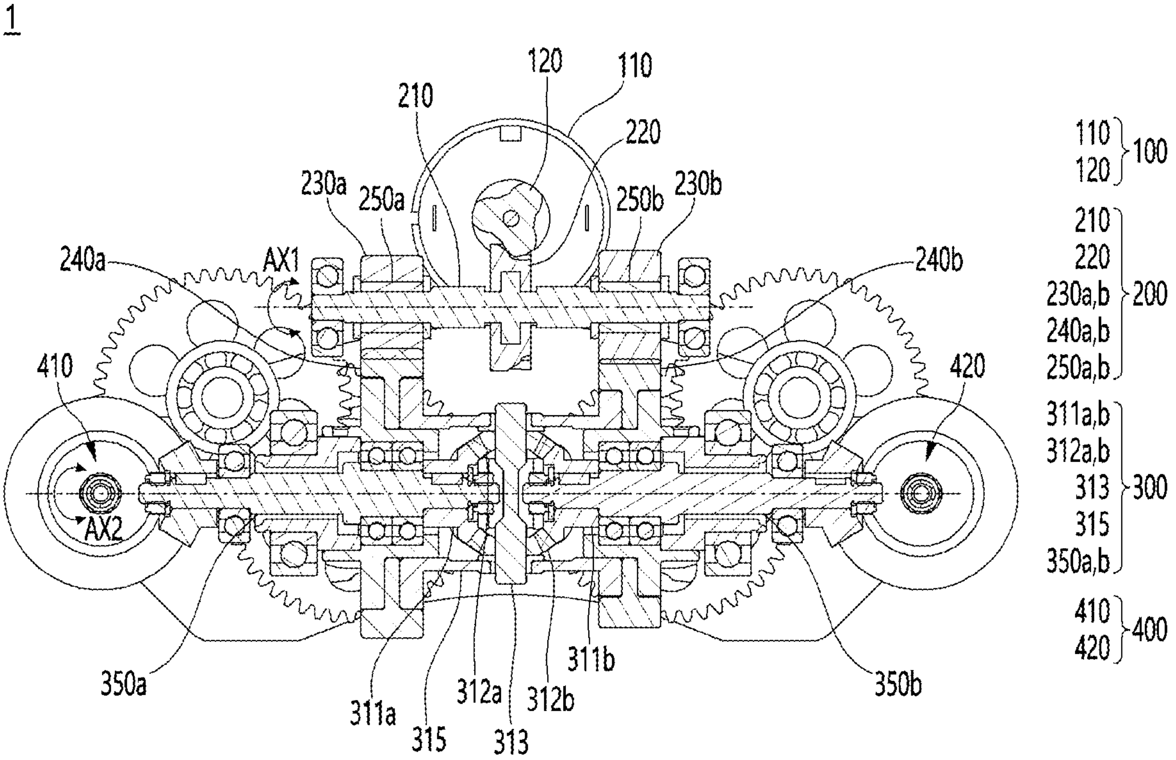
FIG. 3 is a cross-sectional view taken along line A-A' of FIG. 1.
Figure 4:
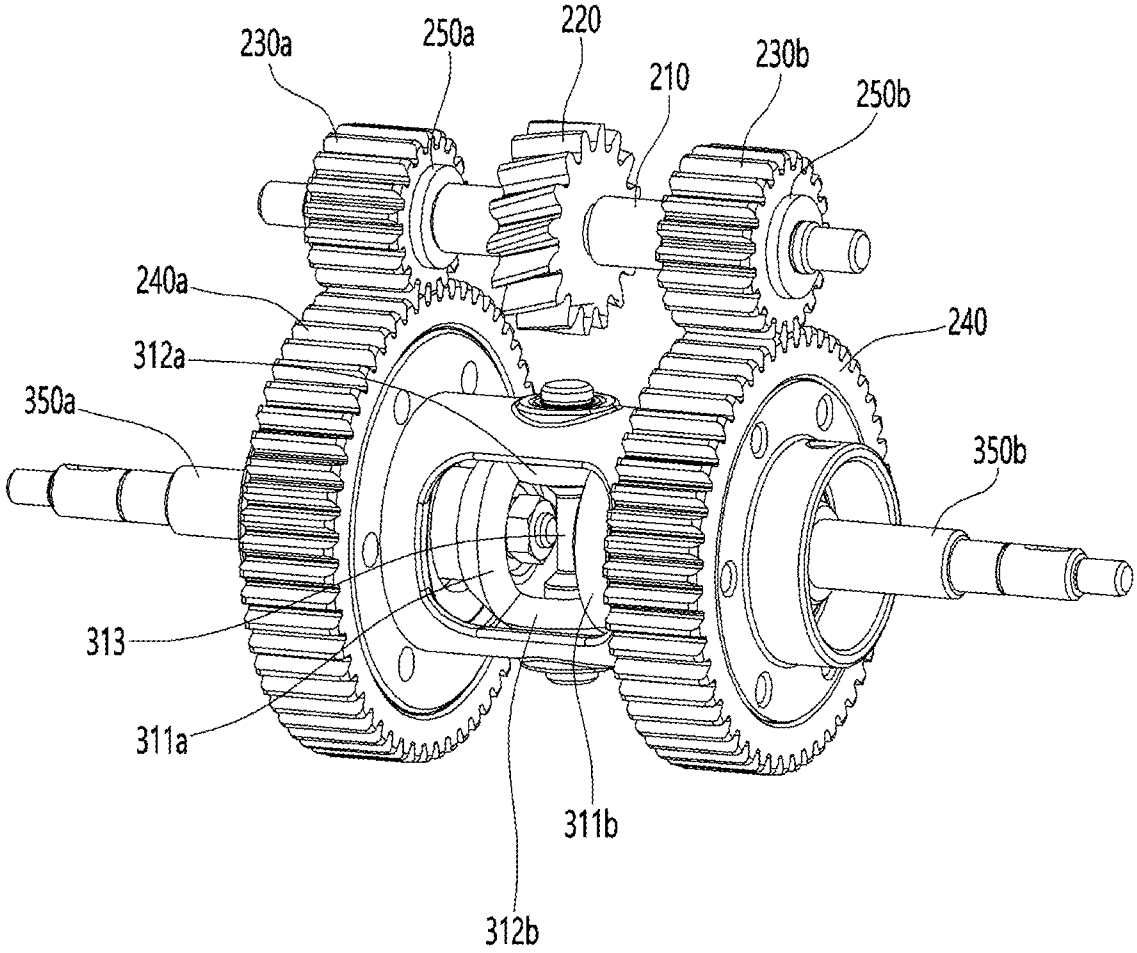
FIG. 4 is a perspective view of a power transmission unit and a power distribution unit according to an embodiment of the present disclosure.
Figure 5:
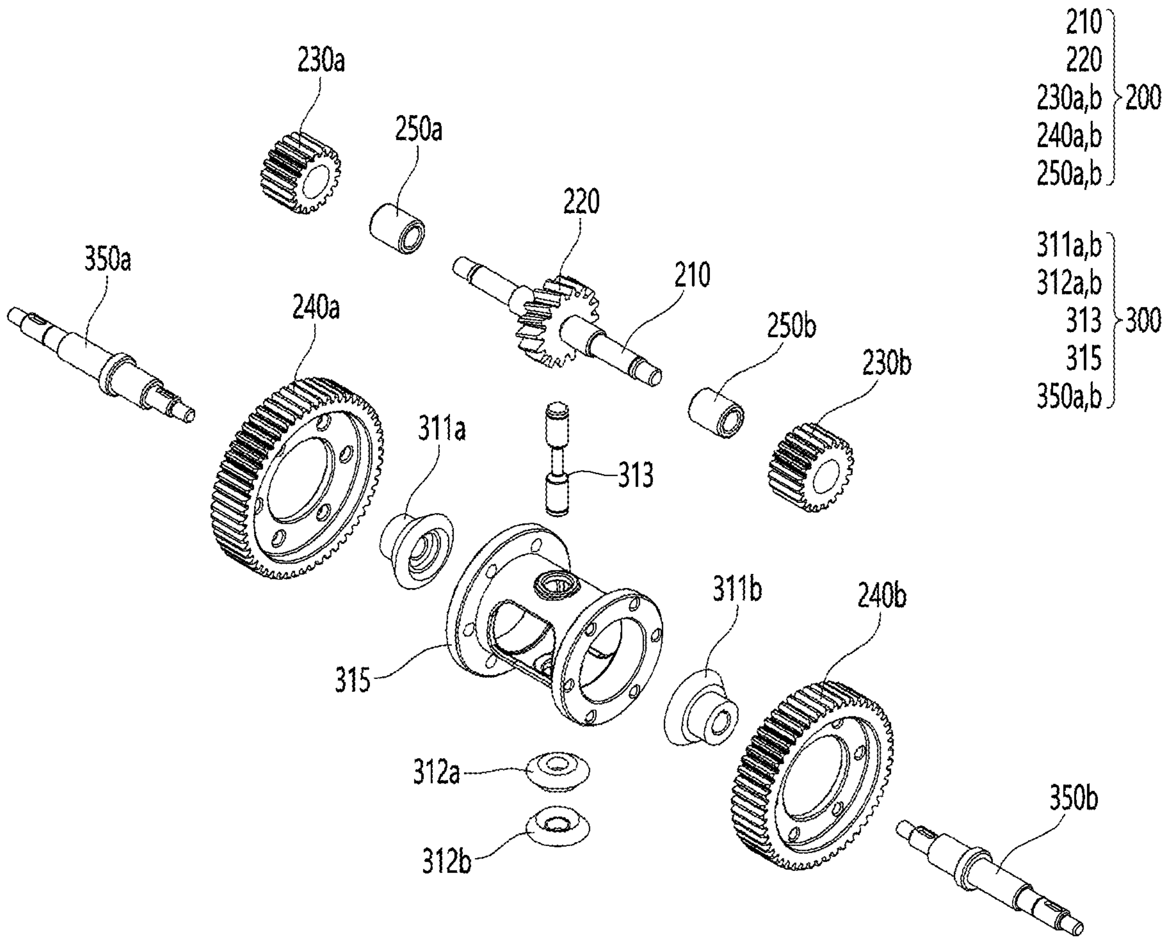
FIG. 5 is an exploded view of the power transmission unit and the power distribution unit according to an embodiment of the present disclosure.
Figure 6:
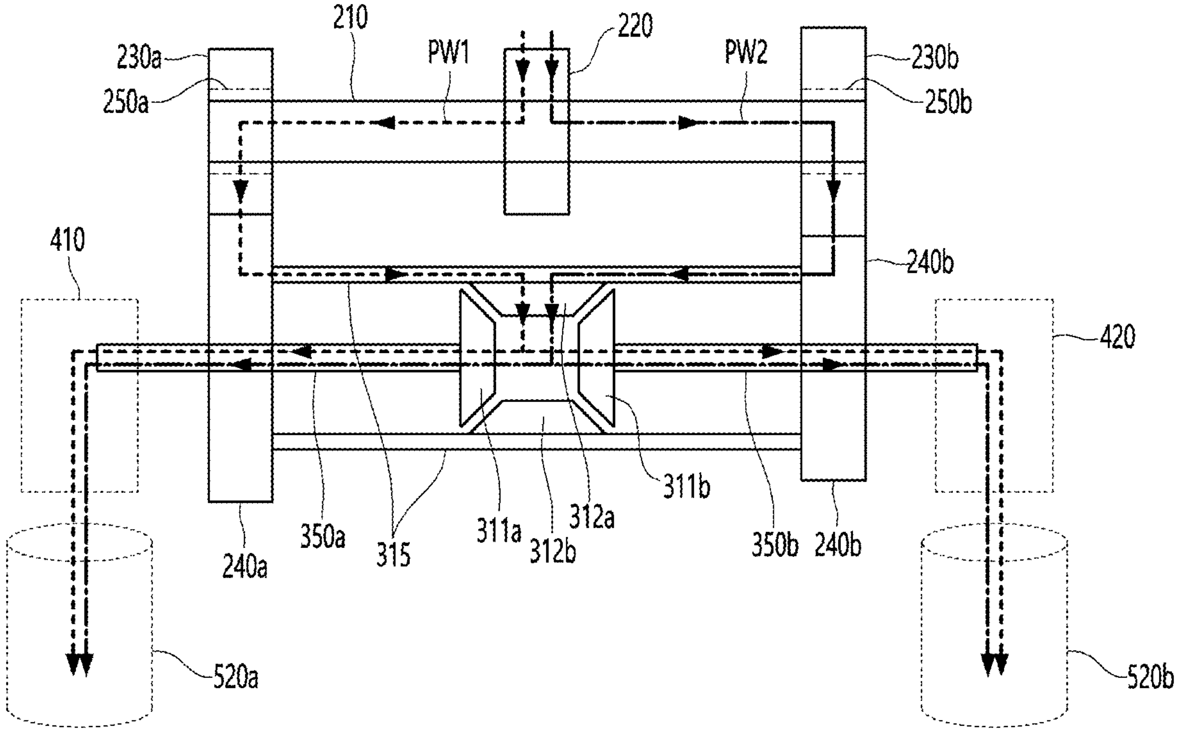
FIG. 6 is a schematic view for describing a flow of driving force according to an embodiment of the present disclosure.
Figure 7:
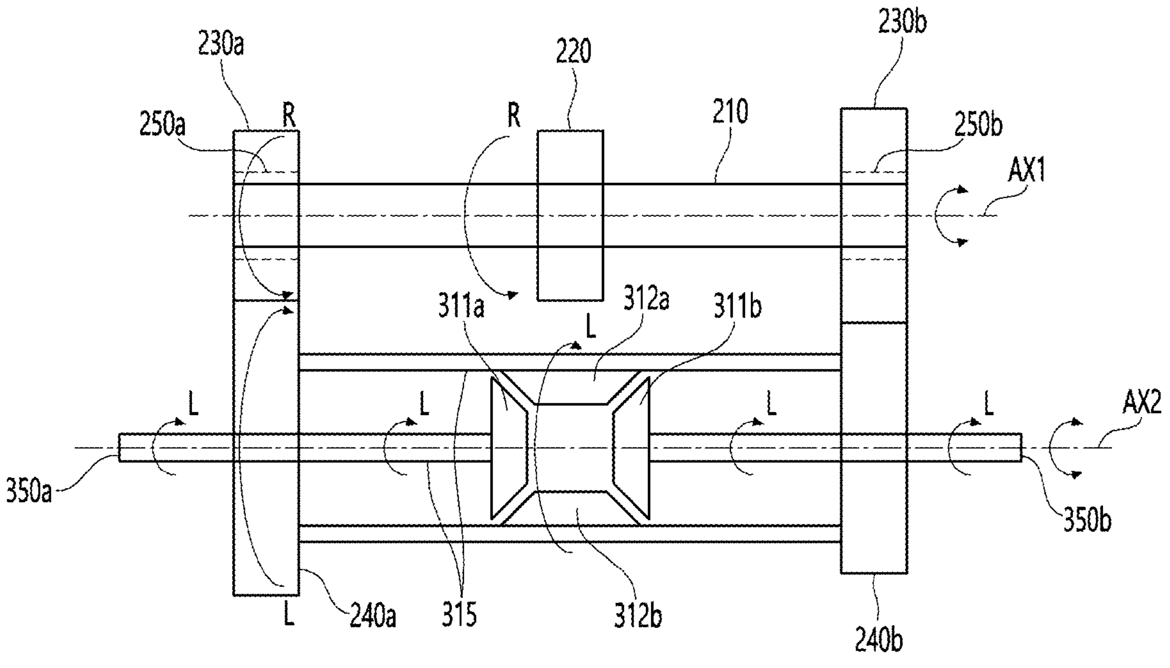
FIGS. 7 and 8 are schematic views for describing a rotation direction of the power transmission unit and the power distribution unit according to an embodiment of the present disclosure.
Figure 8:
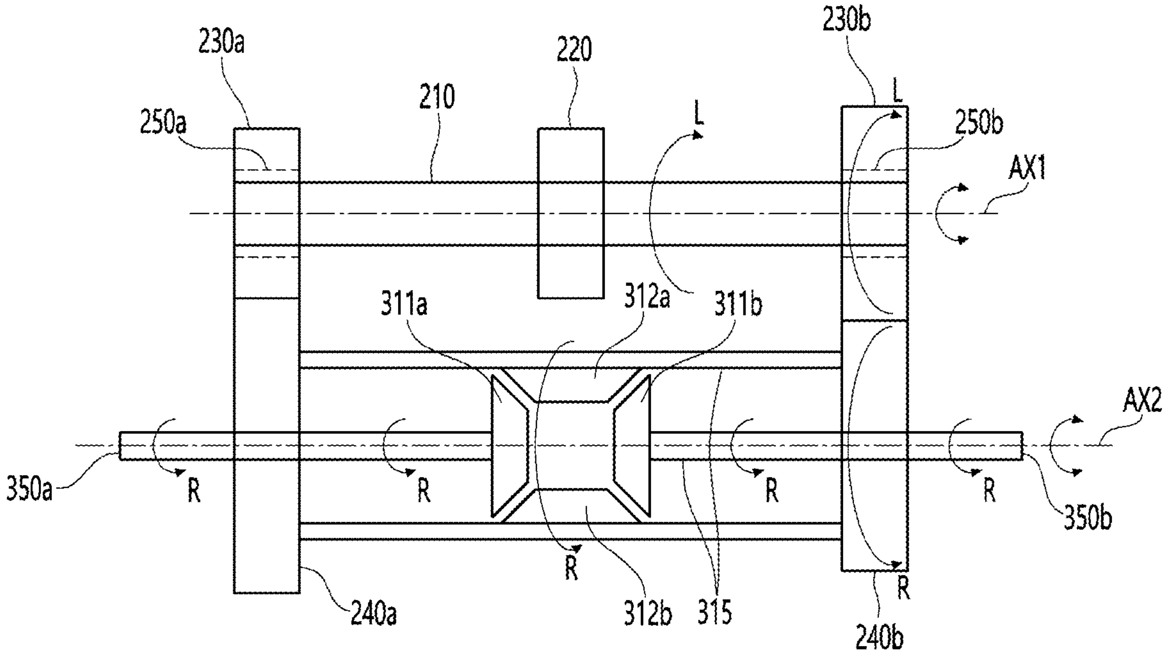

FIG. 1 is a perspective view of an electronic brake device according to an embodiment of the present disclosure. FIG. 2 is a plan view of the electronic brake device according to an embodiment of the present disclosure. FIG. 3 is a cross-sectional view taken along line A-A' of FIG. 1. FIG. 4 is a perspective view of a power transmission unit and a power distribution unit according to an embodiment of the present disclosure. FIG. 5 is an exploded view of the power transmission unit and the power distribution unit according to an embodiment of the present disclosure. FIG. 6 is a schematic view for describing a flow of driving force according to an embodiment of the present disclosure. FIGS. 7 and 8 are schematic views for describing a rotation direction of the power transmission unit and the power distribution unit according to an embodiment of the present disclosure.

Referring to FIG. 1, an electronic brake device 1 according to an embodiment of the present disclosure may include a driving unit 100, a power transmission unit 200, a power distribution unit 300, a transmission gear unit 400, and a pressing unit 500.

The driving unit 100 may provide a driving force to the electronic brake device 1 and may include a driving motor 110 and a driving shaft 120.

The driving motor 110 may generate a driving force, which is required to generate or release a braking force, by using an externally applied current. Specifically, the driving motor 110 may provide a first driving force PW1 or a second driving force PW2 which corresponds to a direction of a current applied to the driving motor 110. In this case, the first driving force PW1 and the second driving force PW2 may have opposite rotation directions with respect to the same rotation axis, but the present disclosure is not limited thereto. When the first driving force PW1 and the second driving force PW2 have rotation directions to rotate around different rotation axes, the first driving force PW1 and the second driving force PW2 may be set to have rotation directions that forms a preset angle.

The driving motor 110 may be provided as any type of power device such as a direct current (DC) motor or a step motor which may receive a current from the outside to generate a driving force. Furthermore, the driving motor 110 may have a great rotational torque for improved braking force and may have high revolutions per minute (RPM) for improved responsiveness. Since the driving motor 110 is applied to the electronic brake device 1 of a related art in various structures, a detailed description of the internal configuration and operation principle of the driving motor 110 will be omitted.

The driving shaft 120 according to an embodiment of the present disclosure may be connected to one side of the driving motor 110 to provide a driving force from the driving motor 110 to the power transmission unit 200 to be described below.

The driving shaft 120 may be formed in a shape of a shaft, and a screw groove having a preset depth and width may be formed at one side of the driving shaft 120, specifically, in an area connected to the power transmission unit 200. However, the present disclosure is not limited thereto, and the driving shaft 120 may be formed in various shapes, which are capable of transmitting a driving force generated from the driving motor 110 to the power transmission unit 200, such as a shape of a combination of a plurality of gears and a plurality of shafts.

In an embodiment, a gear may be connected to one side of the driving shaft 120, and the gear may be formed integrally with the driving shaft 120 without a coupling surface or may be formed separately. The gear and a driving gear 220 to be described below may be provided as a pair of helical gears or a pair of bevel gears.

Referring to FIGS. 1 to 5, the power transmission unit 200 according to an embodiment of the present disclosure may receive a driving force from the driving unit 100 to transmit the received driving force to the power distribution unit 300. Specifically, the power transmission unit 200 may selectively transmit torque, which is required in a parking braking operation situation or a braking release situation of a vehicle, to the power distribution unit 300.

The power transmission unit 200 may include a driving shaft 210, the driving gear 220, first and second driving gears 230*a* and 230*b*, first and second driven gears 240*a* and 240*b*, and first and second one-way clutches 250*a* and 250*b*.

The driving shaft 210 according to an embodiment of the present disclosure may be connected to one side of the driving unit 100 to be rotated in a first direction R or a second direction L by a driving force.

The driving shaft 210 may rotate in the first direction R or the second direction L with respect to a first rotation axis AX1, and a rotation direction thereof may be changed in response to a driving force received from the driving unit 100.

In an embodiment, when the first driving force PW1 is received from the driving unit 100, the driving shaft 210 may rotate in the first direction R, and when the second driving force PW2 is received from the driving unit 100, the driving shaft 210 may rotate in the second direction L.

A longitudinal center axis of the driving shaft 210 may be the same as the first rotation axis AX1.

The driving gear 220 may be connected to one side of the driving shaft 210. In an embodiment, the driving gear 220 may have a through-hole formed in a central portion thereof, and the driving shaft 210 may be insertion-coupled to the through-hole. The driving gear 220 and the driving shaft 210 may be formed in shapes formed separately and coupled to each other, but the present disclosure is not limited thereto, and the driving gear 220 and the driving shaft 210 may be formed integrally with each other.

The driving gear 220 may be positioned between the first driving gear 230*a* and the second driving gear 230*b* and may share the same rotation axis as the first and second driving gears 230*a* and 230*b*. However, the present disclosure is not limited thereto, and the order in which the driving gear 220 and the first and second driving gears 230*a* and 230*b* are positioned on the driving shaft 210 may be modified and implemented in various ways.

The driving gear 220 may be formed in a shape of a gear, and the shape of the gear such as a diameter of the gear and the number of teeth of the gear may be formed to correspond to a shape of the driving shaft 120.

The first driving gear 230*a* and the second driving gear 230*b* according to an embodiment of the present disclosure may be connected to different areas of the driving shaft 210. Specifically, the driving shaft 210 may be connected in a shape inserted into holes formed at central portions of the first and second driving gears 230*a* and 230*b* such that the first and second driving gears 230*a* and 230*b* may rotate around the driving shaft 210.

The first driving gear 230*a* and the second driving gear 230*b* may share the same axis. Specifically, the first driving gear 230*a* and the second driving gear 230*b* may rotate around the first rotation axis AX1 together with the driving shaft 210 and the driving gear 220.

As the driving shaft 210 rotates in the first direction R, the first driving gear 230*a* may rotate in the first direction R, and as the driving shaft 210 rotates in the second direction L, the second driving gear 230*b* may rotate in the second direction L.

In an embodiment, as the driving shaft 210 rotates in the first direction R or the second direction L, the pressing unit 500 may selectively apply a braking force to a disk. Specifically, when the driving unit 100 generates the first driving force PW1, the driving shaft 210 may rotate in the first direction R, and thus first and second piston units 520*a* and 520*b* may apply a braking force to a pad 510 to brake the disk. In addition, when the driving unit 100 generates the second driving force PW2, the driving shaft 210 may rotate in the second direction L, and thus the first and second piston units 520*a* and 520*b* may remove the breaking force applied to the pad 510, thereby releasing a braking state of the disk.

The first driving gear 230*a* and the second driving gear 230*b* may be formed in different shapes. In an embodiment, a radius of the first driving gear 230*a* may be relatively smaller than a radius of the second driving gear 230*b*, and the number of teeth of the first driving gear 230*a* may be relatively less than the number of teeth of the second driving gear 230*b*.

The first one-way clutch 250*a* and the second one-way clutch 250*b* according to an embodiment of the present disclosure may transmit a driving force from the driving shaft 210 to the first driving gear 230*a* and the second driving gear 230*b* and may be connected to one side of the driving shaft 210.

In an embodiment, the first driving gear 230*a* may be rotated only in the first direction R by the first one-way clutch 250*a*, and the second driving gear 230*b* may be rotated only in the second direction L by the second one-way clutch 250*b*.

Referring to FIGS. 6 to 8, the first one-way clutch 250*a* may be a shaft coupling with a structure that transmits only the first driving force PW1 to the first driving gear 230*a*. The first one-way clutch 250*a* may allow rotation in the first direction R and may block rotation in the second direction L, thereby serving to block the transmission of the second driving force PW2.

In an embodiment, the first driving gear 230*a* may be shaft-coupled to the driving shaft 210 through the first one-way clutch 250*a*. The first one-way clutch 250*a* may receive the first driving force PW1 from the driving unit 100 to allow the first driving gear 230*a* to rotate in the first direction R and thus may rotate around the first rotation axis AX1 together with the driving shaft 210. The first one-way clutch 250*a* may block the second driving force PW2 from being transmitted from the driving unit 100 to the first driving gear 230*a*, thereby restricting the first driving gear 230*a* from rotating in the second direction L.

The second one-way clutch 250*b* may be a shaft coupling with a structure that transmits only the second driving force PW2 to the second driving gear 230*b*. The second one-way clutch 250*b* may allow rotation in the second direction L and may block rotation in the first direction R, thereby serving to block the transmission of the first driving force PW1.

In an embodiment, the second driving gear 230*b* may be shaft-coupled to the driving shaft 210 through the second one-way clutch 250*b*. The second one-way clutch 250*b* may receive the second driving force PW2 from the driving unit 100 to allow the second driving gear 230*b* to rotate in the second direction L and thus may rotate around the second rotation axis AX2 together with the driving shaft 210. The second one-way clutch 250*b* may block the first driving force PW1 from being transmitted from the driving unit 100 to the second driving gear 230*b*, thereby restricting the second driving gear 230*b* from rotating in the first direction RL.

Specifically, this means that the first driving gear 230*a* is restricted from being rotated in the second direction L due to the transmission of the second driving force PW2 from the driving shaft 210 and the first one-way clutch 250*a*. The first driving gear 230*a* may be engaged with and connected to the first driven gear 240*a*, which will be described below, to rotate in the second direction L due to the rotation of the first driven gear 240*a*. Furthermore, this means that the second driving gear 230*b* is restricted from being rotated in the first direction R due to the transmission of the first driving force PW1 from the driving shaft 210 and the second one-way clutch 250*b*. The second driving gear 230*b* may be engaged with and connected to the second driven gear 240*b*, which will be described below, to rotate in the first direction R due to the rotation of the second driven gear 240*b*.

Since the first one-way clutch 250*a* and the second one-way clutch 250*b* are applied to a vehicle in various structures, detailed a description of the internal configuration and operation principle thereof will be omitted.

The first driven gear 240*a* according to an embodiment of the present disclosure may be engaged with and connected to the first driving gear 230*a* and may be rotatably connected to a first driven shaft 350*a* to be described below, and the second driven gear 240*b* may be engaged with and connected to the second driving gear 230*b* and may be rotatably connected to the second driven shaft 350*b* to be described below.

The first driven gear 240*a* and the second driven gear 240*b* may be formed in a shape of a gear, and a radius of the gear, the number of teeth of the gear, an addendum, a dedendum, and the like may be set in advance.

In an embodiment, the radius of the first driven gear 240*a* may be relatively greater than the radius of the second driven gear 240*b*, and the number of gear teeth of the first driven gear 240*a* may be greater than the number of gear teeth of the second driven gear 240*b*.

In an embodiment, the sum of radii of the first driven gear 240*a* and the first driving gear 230*a* may be set to be equal to the sum of radii of the second driven gear 240*b* and the second driving gear 230*b*. As a result, the driving shaft 210, which serves as a center shaft for rotation of the first driving gear 230*a* and the second driving gear 230*b*, may be disposed parallel to a driven axis which serves as a center axis for rotation of the first driven gear 240*a* and the second driven gear 240*b*.

In an embodiment, the radius of the first driven gear 240*a* may be greater than the radius of the first driving gear 230*a*. As a result, as the first driving force PW1 is transmitted from the first driving gear 230*a* to the first driven gear 240*a*, a rotational angular speed may decrease, and torque may increase.

In an embodiment, the radius of the second driven gear 240*b* may be less than the radius of the second driving gear 230*b*. As a result, as the second driving force PW2 is transmitted from the second driving gear 230*b* to the second driven gear 240*b*, a rotational angular speed may increase, and torque may decrease.

In another embodiment, the radius of the second driven gear 240*b* may be equal to the radius of the second driving gear 230*b*.

A gear ratio of the first driven gear 240*a* to the first driving gear 230*a* may be set to be different from a gear ratio of the second driven gear 240*b* to the second driving gear 230*b*. Specifically, a first gear ratio of the first driven gear 240*a* to the first driving gear 230*a* (the number of teeth of first driven gear 240*a*/the number of teeth of the first driving gear 230*a*) may be different from a second gear ratio of the second driven gear 240*b* to the second driving gear 230*b* (the number of teeth of the second driven gear 240*b*/the number of teeth of the second driving gear 230*b*) such that a driving force generated from the driving unit 100 is transmitted to the pressing unit 500 at different speeds and torques.

Referring to FIG. 6, the gear ratio of the first driven gear 240*a* to the first driving gear 230*a* according to an embodiment of the present disclosure may be set to be relatively greater than the gear ratio of the second driven gear 240*b* to the second driven gear 240*b*. As a result, output torque provided to first and second transmission gears 410 and 420 as the first driving force PW1 is transmitted through the first driving gear 230*a*, the first driven gear 240*a*, and first and second driven shafts 350*a* and 350*b* may have a relatively larger value than output torque provided to the first and second transmission gears 410 and 420 as the second driving force PW2 is transmitted through the second driving gear 230*b*, the second driven gear 240*b*, and the first and second driven shafts 350*a* and 350*b*, and a rotational angular speed may have a relatively smaller value.

In an embodiment, the first gear ratio may be greater than 1, and the second gear ratio may be less than or equal to 1. As a result, a moving speed of the pad 510 due to the first driving force PW1 provided by the driving unit 100 may be relatively slower than a moving speed of the pad 510 due to the second driving force PW2, and the first driving force PW1 may provide a greater force than the second driving force PW2.

The first driving gear 230*a* and the first driven gear 240*a* may be provided as a pair of spur gears engaged with each other, and gear teeth, which are parallel to the driving shaft 210, may be formed on outer peripheral surfaces of the first driving gear 230*a* and the first driven gear 240*a*. In addition, the first driving gear 230*a* and the first driven gear 240*a* may have parallel axes and different numbers of teeth and may be engaged with each other. However, the present disclosure is not limited thereto, and the first driving gear 230*a* and the first driven gear 240*a* may be formed as various gear pairs within the technical idea such as helical gears or bevel gears capable of increasing or decreasing torque while transmitting a driving force.

In an embodiment, the second driving gear 230*b* and the second driven gear 240*b* may be provided as a pair of spur gears engaged with each other, and gear teeth, which are parallel to the driving shaft 210, may be formed on outer peripheral surfaces of the second driving gear 230*b* and the second driven gear 240*b*. In addition, the second driving gear 230*b* and the second driven gear 240*b* may have parallel axes and different numbers of teeth and may be engaged with each other.

However, the present disclosure is not limited thereto, and the second driving gear 230*b* and the second driven gear 240*b* may be formed as various gear pairs within the technical idea such as helical gears or bevel gears capable of increasing or decreasing torque while transmitting a driving force.

Referring to FIGS. 1 to 5, the power distribution unit 300 according to an embodiment of the present disclosure may transmit a driving force from the power transmission unit 200 to a transmission gear unit 400 and may include a differential gear unit 310, the first driven shaft 350*a*, and the second driven shaft 350*b*.

The differential gear unit 310 may be connected to one side of the power transmission unit 200 and may control the distribution of a driving force provided from the power transmission unit 200 to transmit the distributed driving force to the first driven shaft 350*a* and the second driven shaft 350*b*.

The differential gear unit 310 may distribute a driving force uniformly or equally to the first driven shaft 350*a* and the second driven shaft 350*b* and thus may provide a uniform or equal driving force to the first piston unit 520*a* and the second piston unit 520*b* which will be described below. As a result, in the electronic brake device 1, a uniform pressing force may be applied to the pad 510 by using the first piston unit 520*a* and the second piston unit 520*b*, thereby obtaining an effect of effectively braking the disk.

The differential gear unit 310 according to an embodiment of the present disclosure may include first and second side gears 311*a* and 311*b*, first and second pinion gears 312, a pinion shaft 313, and a differential gear housing 315.

The first side gear 311*a* may be connected to one side of the first driven shaft 350*a* and may distribute a driving force to the first driven shaft 350*a*. In an embodiment, the first side gear 311*a* may be connected to share the same rotation axis with the first driven shaft 350*a*, and the same rotation center axis may be a second rotation axis AX2. However, the present disclosure is not limited thereto, and various modified embodiments are possible within the technical idea in which the first side gear 311*a* and the first driven shaft 350*a* may be connected perpendicular to each other, and thus the rotation center axes of the first side gear 311*a* and the first driven shaft 350*a* may be positioned perpendicular to each other to distribute a driving force from the first side gear 311*a* to the first driven shaft 350*a*.

The second side gear 311*b* may be connected to one side of the second driven shaft 350*b* and may distribute a driving force to the second driven shaft 350*b*. In an embodiment, the second side gear 311*b* may be connected to share the same rotation axis with the second driven shaft 350*b*, and the same rotation center axis may be the second rotation axis AX2. However, the present disclosure is not limited thereto, and various embodiments are possible within the technical idea in which the second side gear 311*b* and the second driven shaft 350*b* may be connected perpendicular to each other, and thus the rotation center axes of the second side gear 311*b* and the second driven shaft 350*b* may be positioned perpendicular to each other to distribute a driving force from the second side gear 311*b* to the second driven shaft 350*b*.

In an embodiment, the first side gear 311*a* and the second side gear 311*b* may be disposed to face each other. However, the present disclosure is not limited thereto, and the first side gear 311*a* and the second side gear 311*b* may be disposed to form a preset angle.

In another embodiment, when the first driven shaft 350*a* and the second driven shaft 350*b* are disposed in parallel with each other, the first side gear 311*a* and the second side gear 311*b* be disposed to face the same direction.

In another embodiment, when a hole having a preset radius with respect to a longitudinal center axis of the first driven shaft 350*a* is formed to extend from one end to the other end of the first driven shaft 350*a*, and the second driven shaft 350*b* is inserted into the hole, the first side gear 311*a* and the second side gear 311*b* may be disposed to face the same direction, and also the second side gear 311*b* may be rotatably inserted into one side of the first side gear 311*a*. Specifically, a hole having a preset radius with respect to a rotation center axis of the first side gear 311*a* may be formed in the first side gear 311*a*, and the second side gear 311*b* may be inserted into the hole.

In another embodiment, when a hole having a preset radius with respect to a longitudinal center axis of the second driven shaft 350*b* is formed to extend from one end to the other end of the second driven shaft 350*b*, and the first driven shaft 350*a* is inserted into the hole, the first side gear 311*a* and the second side gear 311*b* may be disposed to face the same direction, and also the first side gear 311*a* may be rotatably inserted into one side of the second side gear 311*b*. Specifically, a hole having a preset radius with respect to a rotation center axis of the second side gear 311*b* may be formed in the second side gear 311*b*, and the first side gear 311*a* may be inserted into the hole.

When the first pinion gear 312*a* and the second pinion gear 312*b* according to an embodiment of the present disclosure (hereinafter the general term for the first and second pinion gears 312*a* and 312*b* is defined as a pair of pinion gears 312) may be perpendicularly engaged with and connected to the first side gear 311*a* and the second side gear 311*b*, respectively, the pair of pinion gears 312 may be disposed to face each other.

The differential gear housing 315 may form an exterior of the differential gear unit 310 and the first and second side gears 311*a* and 311*b* and the pair of pinion gears 312 may be arranged at preset positions in advance.

In an embodiment, the differential gear housing 315 may be connected to the power transmission unit 200, and specifically may be connected to at least one of the first driven gear 240*a* and the second driven gear 240*b*. As a result, when the driving unit 100 generates the first driving force PW1, the differential gear housing 315 may receive the first driving force PW1 from the first driven gear 240*a*, and when the driving unit 100 generates the second driving force PW2, the differential gear housing 315 may receive the second driving force PW2 from the second driven gear 240*b*.

In another embodiment, the first driven gear 240*a* and the second driven gear 240*b* may be connected to the pair of pinion gears 312 or the pinion shaft 313. In this case, when the driving unit 100 generates the first driving force PW1, the pair of pinion gears 312 or the pinion shaft 313 receives the first driving force PW1 from the first driven gear 240*a*, and when the driving unit 100 generates the second driving force PW2, the pair of pinion gears 312 or the pinion shaft 313 may receive the second driving force PW2 from the second driven gear 240*b*.

The differential gear unit 310 according to an embodiment of the present disclosure may be connected to the power transmission unit 200 and may be disposed between the first driven shaft 350*a* and the second driven shaft 350*b*. Thus, the differential gear unit 310 may selectively receive the first driving force PW1 or the second driving force PW2 to distribute the received driving force to the first driven shaft 350*a* and the second driven shaft 350*b*, wherein the first driving force PW1 and the second driving force PW2 have different rotation directions by the first and second one-way clutches 250*a* and 250*b* of the power transmission unit 200.

Accordingly, in the electronic brake device 1, only through a pair of gears including the first driving gear 230*a* and the first driven gear 240*a* and the other pair of gears including the second driving gear 230*b* and the second driven gear 240*b*, two types of torques may be output, thereby obtaining an effect in which the electronic brake device 1 may be manufactured compactly.

Since the differential gear unit 310 is applied to a vehicle of a related art in various structures, a detailed description of the internal configuration and operation principle of the differential gear unit 310 will be omitted.

The first driven shaft 350*a* may receive a driving force from the differential gear unit 310 to transmit the driving force to the first transmission gear 410 and may be formed in a shape of a shaft. However, the present disclosure not limited thereto, and the first driven shaft 350*a* may be formed as a combination of a plurality of shafts and a plurality of gears to correspond to a position of the first transmission gear 410.

The first driven shaft 350*a* may be relatively rotatably connected to the first driven gear 240*a*.

In an embodiment, the first driven shaft 350*a* and the first driven gear 240*a* may be connected through a bearing, and thus the rotations of the first driven shaft 350*a* and the first driven gear 240*a* may be performed independently of each other.

The second driven shaft 350*b* may receive a driving force from the differential gear unit 310 to transmit the driving force to the second transmission gear 420 and may be formed in a shape of a shaft. However, the present disclosure not limited thereto, and the second driven shaft 350*b* may be formed as a combination of a plurality of shafts and a plurality of gears to correspond to a position of the second transmission gear 420.

The second driven shaft 350*b* may be relatively rotatably connected to the second driven gear 240*b*.

In an embodiment, the second driven shaft 350*b* and the second driven gear 240*b* may be connected through a bearing, and thus the rotations of the second driven shaft 350*b* and the second driven gear 240*b* may be performed independently of each other.

The pinion shaft 313 according to an embodiment of the present disclosure my serve as a rotation shaft of the pinion gear, may be formed in a shape of a shaft, and may be disposed on a rotation center axis of the pair of pinion gears 312.

In another embodiment, the first driven shaft 350*a* and the first driven gear 240*a* may be disposed to be spaced apart from each other by a preset interval, and the first driven shaft 350*a* and the first driven gear 240*a* may be disposed to be spaced apart from each other by a preset interval.

In an embodiment, the first driven shaft 350*a* and the second driven shaft 350*b* may be disposed in series while sharing the same rotation axis. Specifically, the first driven shaft 350*a* and the second driven shaft 350*b* may rotate around the second rotation axis AX2. However, the present is not limited thereto, and the first driven shaft 350*a* and the second driven shaft 350*b* may be disposed to form a preset angle. In this case, the first side gear 311*a* and the second side gear 311*b* may be arranged at the same angle as the preset angle.

In an embodiment, the driving shaft 210 and the first driven shaft 350*a* may be arranged in parallel, and the driving shaft 210 and the second driven shaft 350*b* may be disposed in parallel. In this case, a vertical distance between any point of the driving shaft 210 and the first driven shaft 350*a* may be set to be equal to a vertical distance between any point of the driving shaft 210 and the second driven shaft 350*b*. The vertical distance may have the same value as the sum of the radii of the first driving gear 230*a* and the first driven gear 240*a* and the sum of the radii of the second driving gear 230*b* and the second driven gear 240*b*.

In an embodiment, the driving shaft 210, the first driving gear 230*a*, the second driving gear 230*b*, the first one-way clutch 250*a*, and the second one-way clutch 250*b* may rotate around the first rotation axis AX1. The differential gear unit 310, the first driven shaft 350*a*, the second driven shaft 350*b*, the first driven gear 240*a*, and the second driven gear 240*b* may rotate around the second rotation axis AX2. The first rotation axis AX1 and the second rotation axis AX2 may be disposed in parallel with each other. As a result, in the electronic brake device 1, two different types of torques may be output by using only two adjacent and parallel rotation axes, thereby obtaining an effect in which the electronic brake device 1 may be manufactured compactly.

The transmission gear unit 400 according to an embodiment of the present disclosure may receive a driving force from the first driven shaft 350*a* and the second driven shaft 350*b* and may provide the driving force to the pressing unit 500 that applies a braking force to the disk.

The transmission gear unit 400 may include the first transmission gear 410 connected to each of the first driven shaft 350*a* and the second transmission gear 420 connected to each of the second driven shaft 350*b* and the second piston unit 520*b*.

The first transmission gear 410 and the second transmission gear 420 may be formed in various shapes within the technical idea in which the first transmission gear 410 and the second transmission gear 420 may be provided as a combination of a plurality of gears and a plurality of shafts forming rotation center axes of the plurality of gears to transmit a driving force from the first driven shaft 350*a* and the second driven shaft 350*b* to the first piston unit 520*a* and the second piston unit 520*b*.

The first transmission gear 410 and the second transmission gear 420 may include a plurality of reduction gears. As a result, the first driving force PW1 or torque output to the first driven shaft 350*a* and the second driven shaft 350*b* by the driving force may be increased and provided to the pressing unit 500, thereby obtaining an effect of improving performance of breaking the brake.

The pressing unit 500 according to an embodiment of the present disclosure may selectively apply a braking force to the disk and may include the pad 510, the first piston unit 520*a*, and the second piston unit 520*b*.

In an embodiment, the first piston unit 520*a* and the second piston unit 520*b* may be disposed in parallel and may come into contact with the same side of the pad 510. For example, a longitudinal center axis of the first piston unit 520*a* and a longitudinal center axis of the second piston unit 520*b* may be formed perpendicular to the first rotation axis AX1 or the second rotation axis AX2.

In another embodiment, the first piston unit 520*a* and the second piston unit 520*b* may come into contact with different pads 510 while sharing the same longitudinal center axis. The different pads 510 may apply a braking force to different sides of the disk, and thus the different pads 510 may apply a braking force to both sides of the disk by the first piston unit 520*a* and the second piston unit 520*b*.

Since the pad 510 and the first and second piston units 520*a* and 520*b* are applied to a brake device of a related art in various structures, a detailed description of the internal configuration and operation principle of the pad 510 and the first and second piston units 520*a* and 520*b* will be omitted.

The first piston unit 520*a* and the second piston unit 520*b* may apply a braking force to the disk in a pressing direction D. Specifically, when the driving unit 100 generates the first driving force PW1, the first piston unit 520*a* and the second piston unit 520*b* may apply a braking force while moving in the pressing direction D toward the disk. In addition, when the driving unit 100 generates the second driving force PW2, the first piston unit 520*a* and the second piston unit 520*b* may release the braking force while moving in the pressing direction D opposite to a direction toward the disk.

Hereinafter, the operation principle and effects of the electronic brake device 1 according to an embodiment of the present disclosure described above will be described. In the present specification, the operation principle is described in time series for convenience of description, and the operation principle, the flow of a driving force, and the like which will be described below are not limited to the specific order set forth herein and may be performed simultaneously.

Since the electronic brake device 1 according to an embodiment of the present disclosure includes the differential gear unit 310, a uniform driving force may be distributed to the first piston unit 520*a* and the second piston unit 520*b*, thereby obtaining an effect of preventing deterioration of a braking function caused by a driving force focusing on at least one of the first and second piston units 520*a* and 520*b*.

Furthermore, since the electronic brake device 1 includes the first and second one-way clutches 250*a* and 250*b*, and the first driving gear 230*a* and the first driven gear 240*a* and the second driving gear 230*b* and the second driven gear 240*b*, which have different gear ratios, there is an effect in which a magnitude of torque output during a parking braking operation may be set to be different from a magnitude of torque output when parking braking is released.

Specifically, in the electronic brake device 1, the first gear ratio (the number of teeth of the first driven gear 240*a*/the number of teeth of the first driving gear 230*a*) may be greater than the second gear ratio (the number of teeth of the second driven gear 240*b*/the number of teeth of the second driving gear 230*b*), and since the first one-way clutch 250*a* is included, during a parking braking operation, a driving force may be transmitted through the first driving gear 230*a* and the first driven gear 240*a*.

In addition, since the electronic brake device 1 includes the second one-way clutch 250*b*, when parking braking is released, a driving force is transmitted through the second driving gear 230*b* and the second driven gear 240*b*, thereby obtaining an effect in which a magnitude of torque output during a parking braking operation may be set to be relatively greater than a magnitude of torque output when parking braking is released.

Referring to FIGS. 6 to 8, the driving unit 100 according to an embodiment of the present disclosure may provide the first driving force PW1 to the power transmission unit 200 for a parking braking operation. In an embodiment, a direction of the first driving force PW1 may be set to a direction in which the driving shaft 210 is allowed to rotate in the first direction R, a direction of the second driving force PW2 may be set to a direction in which the driving shaft 210 is allowed to rotate in the second direction L, and a magnitude of the first driving force PW1 may be equal to a magnitude of the second driving force PW2.

In an embodiment, during a parking braking operation, the driving shaft 210 may receive the first driving force PW1 from the driving unit 100 to rotate in the first direction R. The driving shaft 210 may transmit the first driving force PW1 to the first driving gear 230*a* through the first one-way clutch 250*a*, and the first driving gear 230*a* may rotate in the first direction R. Due to the second one-way clutch 250*b* that only allows rotation in the second direction L, the second driving gear 230*b* may be restricted from receiving the first driving force PW1 through the driving shaft 210.

The first driving gear 230*a* may be engaged with and connected to the first driven gear 240*a* to transmit the first driving force PW1 received from the driving shaft 210 to the first driven gear 240*a*, and thus the first driven gear 240*a* may be rotated in the second direction L.

The first driven gear 240*a* may transmit a driving force to the differential gear unit 310 fixedly connected to one side of the first driven gear 240*a*, specifically, to the differential gear housing 315 and at least one of the pair of pinion gears 312 and the pinion shaft 313. In an embodiment, the first gear ratio of the first driven gear 240*a* to the first driving gear 230*a* may be greater than 1 so that while the first driven gear 240*a* may rotate at a rotational speed that is relatively less than a rotational speed of the first driving gear 230*a*, the first driven gear 240*a* may transmit torque, which is relatively greater than torque received from the driving shaft 210 by the first driving gear 230*a*, to the differential gear unit 310.

The differential gear unit 310, specifically, the differential gear housing 315 and at least one of the pair of pinion gears 312 and the pinion shaft 313 may rotate in the second direction L by receiving the first driving force PW1 from the first driven gear 240*a*, and the first and second side gears 311*a* and 311*b* engaged with and connected to the pair of pinion gears 312 may receive the first driving force PW1. In such a process, the first driving force PW1 may be distributed uniformly to the first and second side gears 311*a* and 311*b*, and the uniformly distributed driving force may be transmitted to the first and second driven shafts 350*a* and 350*b*.

The first driven shaft 350*a* may transmit the distributed driving force to the first piston unit 520*a* through the first transmission gear 410, and the first transmission gear 410 may include a plurality of reduction gears to provide torque, which is relatively greater than torque received from the first driven shaft 350*a*, to the first piston unit 520*a*. Furthermore, the second driven shaft 350*b* may transmit the distributed driving force to the second piston unit 520*b* through the second transmission gear 420, and the second transmission gear 420 may include a plurality of reduction gears to provide torque, which is relatively greater than torque received from the second driven shaft 350*b*, to the second piston unit 520*b*.

The first and second piston units 520*a* and 520*b* may each receive the uniformly distributed first driving force PW1 to move in the pressing direction D toward a position of the pad 510 so that pad 510 may apply a braking force based on a frictional force to the disk.

Referring to FIGS. 6 to 8, the driving unit 100 according to an embodiment of the present disclosure may provide the second driving force PW2 to the power transmission unit 200 to release parking braking.

In an embodiment, when parking braking is released, the driving shaft 210 may receive the second driving force from the driving unit 100 to rotate in the second direction L. The driving shaft 210 may transmit the second driving force PW2 to the second driving gear 230*b* through the second one-way clutch 250*b*. Thus, the second driving gear 230*b* may rotate in the second direction L, and due to the first one-way clutch 250*a* that only allows rotation in the first direction R, the first driving gear 230*a* may be restrained from receiving the second driving force PW2 through the driving shaft 210.

The second driving gear 230*b* may be engaged with and connected to the second driven gear 240*b* to transmit the second driving force PW12 received from the driving shaft 210 to the second driven gear 240*b*, and thus the second driven gear 240*b* may be rotated in the first direction R.

The second driven gear 240*b* may transmit a driving force to the differential gear unit 310 fixedly connected to one side of the second driven gear 240*b*, specifically, to the differential gear housing 315 and at least one of the pair of pinion gears 312 and the pinion shaft 313. In an embodiment, the second gear ratio of the second driven gear 240*b* to the second driving gear 230*b* may be 1 or less. In another embodiment, the second gear ratio may exceed 1, but may be set to be less than the first gear ratio.

As a result, while the first driven gear 240*a* may rotate at a relatively less speed than a rotational speed of the second driving gear 230*b*, the second driven gear 240*b* may transmit torque, which is greater than torque received from the driving shaft 210 by the second driving gear 230*b*, to the differential gear unit 310.

The differential gear unit 310, specifically, the differential gear housing 315 and at least one of the pair of pinion gears 312 and the pinion shaft 313 may rotate in the first direction R by receiving the second driving force PW2 from the second driven gear 240*b*, and the first and second side gears 311*a* and 311*b* engaged with and connected to the pair of pinion gears 312 may receive the second driving force PW2. In such a process, the second driving force PW2 may be distributed uniformly to the first and second side gears 311*a* and 311*b*, and the uniformly distributed driving force may be transmitted to the first and second driven shafts 350*a* and 350*b*.

The first driven shaft 350*a* may transmit the distributed driving force to the first piston unit 520*a* through the first transmission gear 410, and the first transmission gear 410 may include a plurality of reduction gears to provide torque, which is relatively greater than torque received from the first driven shaft 350*a*, to the first piston unit 520*a*.

Furthermore, the second driven shaft 350*b* may transmit the distributed driving force to the second piston unit 520*b* through the second transmission gear 420, and the second transmission gear 420 may include a plurality of reduction gears to provide torque, which is relatively greater than torque received from the second driven shaft 350*b*, to the second piston unit 520*b*.

The first and second piston units 520*a* and 520*b* may each receive the uniformly distributed first driving force PW1 to move in the pressing direction D in a direction opposite to the position of the pad 510, thereby releasing a braking force applied to the disk by the pad 510.

Since the first gear ratio may be set to be relatively greater than the second gear ratio, a speed for moving the pad 510 forward with respect to the disk by the first driving force PW1 may be relatively less than a speed of moving the pad 510 backward with respect to the disk. Furthermore, a force for moving the pad 510 forward with respect to the disk by the second driving force PW2 may be relatively greater than a force for moving the pad 510 backward with respect to the disk.

As a result, when a braking force is generated, a greater force may be applied to generate a stable braking force, and when the braking force is released, a faster response rate may be achieved.

The spirit of the present disclosure should not be limited to the above-described embodiments, and not only the scope of the appended claims but also all ranges equivalent to or equivalently changed from the claims are within the scope of the present disclosure.

INDUSTRIAL APPLICABILITY

According to an embodiment of the present disclosure, an electronic brake device is provided. In addition, embodiments of the present disclosure may be applied to an electronic brake device or the like having a power distribution function used industrially.

The invention claimed is:

1. An electronic brake device comprising:

a driving unit which provides a driving force;

a power transmission unit comprising a driving shaft connected to one side of the driving unit to rotate in a first direction or a second direction by the driving force;

a power distribution unit comprising a differential gear unit connected to one side of the power transmission unit, a first driven shaft connected to one side of the differential gear unit, and a second driven shaft connected to the other side of the differential gear unit; and a transmission gear unit which receives the driving force from the first driven shaft and the second driven shaft and provides the driving force to a pressing unit which applies a braking force to a disk, wherein the pressing unit selectively applies the braking force to the disk as the driving shaft rotates in the first direction or the second direction, wherein the power transmission unit further comprises a first one-way clutch connected to one side of the driving shaft, a first driving gear which is rotatable only in the first direction by the first one-way clutch, a second one-way clutch connected to the other side of the driving shaft, and a second driving gear which is rotatable only in the second direction by the second one-way clutch, and wherein the power transmission unit comprises a first driven gear engaged with and connected to the first driving gear and rotatably connected to the first driven shaft, and a second driven gear engaged with and connected to the second driving gear and rotatably connected to the second driven shaft.

2. The electronic brake device of claim 1, wherein the pressing unit comprises a pad which applies the braking force to the disk, and a first piston unit and a second piston unit which provide the driving force to the pad, and the transmission gear unit comprises a first transmission gear which transmits the driving force from the first driven shaft to the first piston unit and a second transmission gear which transmits the driving force from the second driven shaft to the second piston unit.

3. The electronic brake device of claim 1, wherein the first direction and the second direction are opposite directions.

4. The electronic brake device of claim 1, wherein the first driven shaft and the second driven shaft are disposed in series while sharing a same rotation axis.

5. The electronic brake device of claim 1, wherein a gear ratio of the first driving gear to the first driven gear is different from a gear ratio of the second driving gear to the second driven gear.

6. The electronic brake device of claim 1, wherein the first driving gear and the first driven gear are provided as a pair of spur gears, and the second driving gear and the second driven gear are provided as a pair of spur gears.

7. The electronic brake device of claim 1, wherein the differential gear unit is connected to each of the first driven gear and the second driven gear and controls a distribution of the driving force provided by the first driven gear or the second driven gear to transmit the driving force to the first driven shaft and the second driven shaft.

8. The electronic brake device of claim 7, wherein the differential gear unit comprises a first side gear connected to share a same rotation axis with the first driven shaft, a second side gear connected to share a same rotation axis with the second driven shaft, and a pair of pinion gears which are perpendicularly engaged with and connected to the first side gear and the second side gear, respectively, and are disposed to face each other, wherein the pair of pinion gears are connected to the first driven gear and the second driven gear, respectively.

9. The electronic brake device of claim 2, wherein the driving shaft and the first driven shaft are disposed in parallel.

10. The electronic brake device of claim 2, wherein the driving shaft and the second driven shaft are disposed in parallel.

11. The electronic brake device of claim 2, wherein the first piston unit and the second piston unit are disposed in parallel and come into contact with a same surface of the pad.

* * * * *